(12) United States Patent
Sato et al.

(10) Patent No.: US 6,732,049 B2
(45) Date of Patent: May 4, 2004

(54) VEHICLE NAVIGATION SYSTEM AND METHOD

(75) Inventors: Hiroyuki Sato, Hachioji (JP); Kazuo Nakamura, Yokohama (JP)

(73) Assignee: Alpine Electronics, Inc., Tokyo (JP)

( * ) Notice: Subject to any disclaimer, the term of this patent is extended or adjusted under 35 U.S.C. 154(b) by 44 days.

(21) Appl. No.: 10/141,624

(22) Filed: May 8, 2002

(65) Prior Publication Data

US 2002/0188400 A1 Dec. 12, 2002

(30) Foreign Application Priority Data

May 10, 2001 (JP) ........................................ 2001-140028

(51) Int. Cl.[7] .............................................. G01C 21/00
(52) U.S. Cl. ............................. 701/212; 701/23; 701/25
(58) Field of Search .......................... 701/25, 201, 202, 701/211, 212, 23; 340/995

(56) References Cited

U.S. PATENT DOCUMENTS 5,450,343 A * 9/1995 Yurimoto et al. ............ 701/208
6,058,350 A  5/2000 Ihara
6,108,604 A * 8/2000 Fukaya et al. .............. 701/211

FOREIGN PATENT DOCUMENTS

DE  100 12 502 A1  12/2000

* cited by examiner

*Primary Examiner*—Yonel Beaulieu
(74) *Attorney, Agent, or Firm*—Brinks Hofer Gilson & Lione

(57) ABSTRACT

A vehicle navigation system is provided. When route guidance for a vehicle to a destination is performed on the screen of a display unit based on road data for route search, whether or not the vehicle has entered a minor street is determined. When it is determined that the vehicle has entered a minor street, repeat searching for a route leading to the destination is performed by setting the point of entry into the minor street as a new starting point. The screen of the display unit is divided into two screens, and a guidance route is displayed on one of the divided screens based on the result of the repeat searching and road data for minor streets, and the minor street is displayed in a more enlarged form than the other screen.

29 Claims, 6 Drawing Sheets

VEHICLE NAVIGATION SYSTEM AND METHOD

BACKGROUND OF THE INVENTION

1. Field of the Invention

The present invention relates to a vehicle navigation system and method for guiding a vehicle to a destination in accordance with a navigation route. More specifically, the present invention relates to a vehicle navigation system adapted to provide the user with information for navigation to a destination even when the vehicle enters a narrow street (hereinafter referred to as a "minor street" for convenience), such as a small neighborhood road, which has not been searched by route guidance.

2. Description of the Related Art

In the description below, the term "vehicle" generally refers to an automobile, but is not limited thereto.

A typical vehicle navigation system includes a map-data storage device, such as a CD-ROM, DVD-ROM, or IC memory card, in which map data has been stored in advance; a display device; a GPS (global positioning system) receiver; and sensors, such as a gyroscope and a vehicle speed sensor, for detecting the current location and orientation of the vehicle. The map data for an area including the current location of the vehicle is read from the map-data storage device, and a map image for the vicinity of the vehicle is rendered on the display screen based on the read map data. A mark representing a vehicle location is also displayed on the map image on the display screen. The map image can be scrolled on the screen in response to the movement of the vehicle or the vehicle location mark can be moved with the map image being fixed on the screen, thereby allowing a user to recognize at a glance where the vehicle is currently travelling.

The vehicle navigation system commonly incorporates a function (a route navigation function) for guiding the user to travel with ease toward a destination without taking a wrong road. Using map data, the route navigation function automatically searches for an optimum route (typically, the most cost-effective route) connecting from a starting point (e.g., the current location of a vehicle) to a destination by performing a simulation, employing a breadth-first search method, the Dijkstra method, or the like, and stores the route found by the search as a navigation route. When travelling, the navigation route is displayed on a map image in a distinct manner (e.g., in a different color or in a broader line) from the other roads, and when approaching a predetermined distance from an intersection at which the vehicle is to make a turn on the navigation route, a guide map (an enlarged intersection map and an arrow indicating a new travel direction at the intersection) or the like is displayed, thereby allowing the user to grasp an optimum route to a destination.

Prior to route searching, the user sets a destination and, as required, a way point on the way thereto (i.e., which route should be taken to reach the destination). If necessary, the user additionally sets various conditions (e.g., whether or not a toll road should be taken and/or whether priority should be given to distance or driving time). Based on the set data, the navigation system searches for a plurality of routes to the destination, displays the found routes in different colors, and guides the user in accordance with a route selected by the user from among the routes found.

In such route guidance, a conventional navigation system separately stores road data for route guidance and road data for display, and thus uses the former road data for route searching and route guidance and uses the latter road data for displaying the map. In this case, the road data for route guidance is stored together with associated traffic regulation information (e.g., no left/right turn, wrong way) for each road and cost data, such as distance and time, used for searching for a recommended route. However, data for, for example, minor streets, such as small neighborhood roads, is not included in the road data for route guidance because part of the traffic regulation information thereof has not been surveyed. As a result, while minor streets are displayed on the map based on the road data for display, in practice, they are not searched by route searching (and are not used for route guidance).

In such a conventional vehicle navigation system, as described above, since minor streets are only displayed on the map and are not searched by route searching (and are not used for route guidance), the conventional vehicle navigation system has a problem in that, in particular, in an area where there are many minor streets, such as in an urban area, the set starting point or the destination may be far from a recommended road. The conventional navigation system also has a problem in that it cannot provide the user with detailed information for guiding him or her from a starting point to a navigation route or from the navigation route to the destination.

In addition, when the vehicle goes off an intended guidance route and the driver loses his or her way on a minor street, the conventional navigation system has a disadvantage in that the user feels a sense of insecurity, thereby making it difficult for him or her to drive safely.

In the future, it is predicted that traffic regulation information will be expanded to cover minor street data. If, however, minor street data that is associated with and minor street data that is not associated with traffic regulation information coexist, it is difficult to distinguish therebetween. In such a case, the minor street data that is not associated with traffic regulation information is excluded from data that is used for route searching (route guidance), as in the conventional manner. The result is that such an arrangement still cannot provide detailed guidance information to a destination.

SUMMARY OF THE INVENTION

The present invention has been made in view of the foregoing deficiencies of the related art, and an object of the present invention is to provide a vehicle navigation system which can offer information for reliable navigation to a destination even when a vehicle has entered a minor street, and which can enhance usability so that the user can travel with an increased sense of security.

To overcome the foregoing problems of the related art, the vehicle navigation system according to the present invention includes a vehicle-location determination unit for determining the current location of a vehicle; an information input unit (operation unit) for inputting a destination and information necessary for searching for a route; and a display unit for providing the user with guidance information. The vehicle navigation system further includes a first data storage unit for storing map data including road data for display and road data for route searching and a second data storage unit (database) for storing road data concerning narrow streets, having a predetermined width or below, which are not included in the road data for route searching; and a controller connected in a controllable manner with the vehicle-location determination unit, information input unit, display unit, and the first and second storage units. During route guidance to a destination on the screen of the display unit, based on the road data for route searching, the controller determines whether or not the vehicle has entered a minor street by referring to the map data. When the controller determines that the vehicle has entered a minor street, the controller sets the point of entry into the minor street as a new starting point and searches again for a route to the destination using the minor streets and causes the screen of the display unit to be divided into first and second screens. Based on the result of the repeated search and the road data for minor streets, the guidance route is displayed unmodified on the first screen, and the minor street is displayed on the second screen in an enlarged form relative to the first screen.

According to the vehicle navigation system of the present invention, therefore, when a vehicle enters a minor street during route guidance to a destination on the screen of the display unit, the display screen is divided into first and second screens. Based on the result of the repeated search and the road data for minor streets, the guidance route is displayed unmodified on the first screen, and the minor street is displayed on the second screen in an enlarged form relative to the first screen. Accordingly, the present invention provides a vehicle navigation system that provides information for reliable navigation to a destination even when a vehicle enters a minor street.

With this arrangement, the user can obtain a detailed guidance route (in this case, a minor street) with the second screen, which is displayed in an enlarged form, on the display unit, and can drive the vehicle, unlike in the related art, with a sense of security while following the guidance route.

DESCRIPTION OF THE PREFERRED EMBODIMENT

The embodiment of the present invention will now be described with reference to the accompanying drawings.

Figure 1:
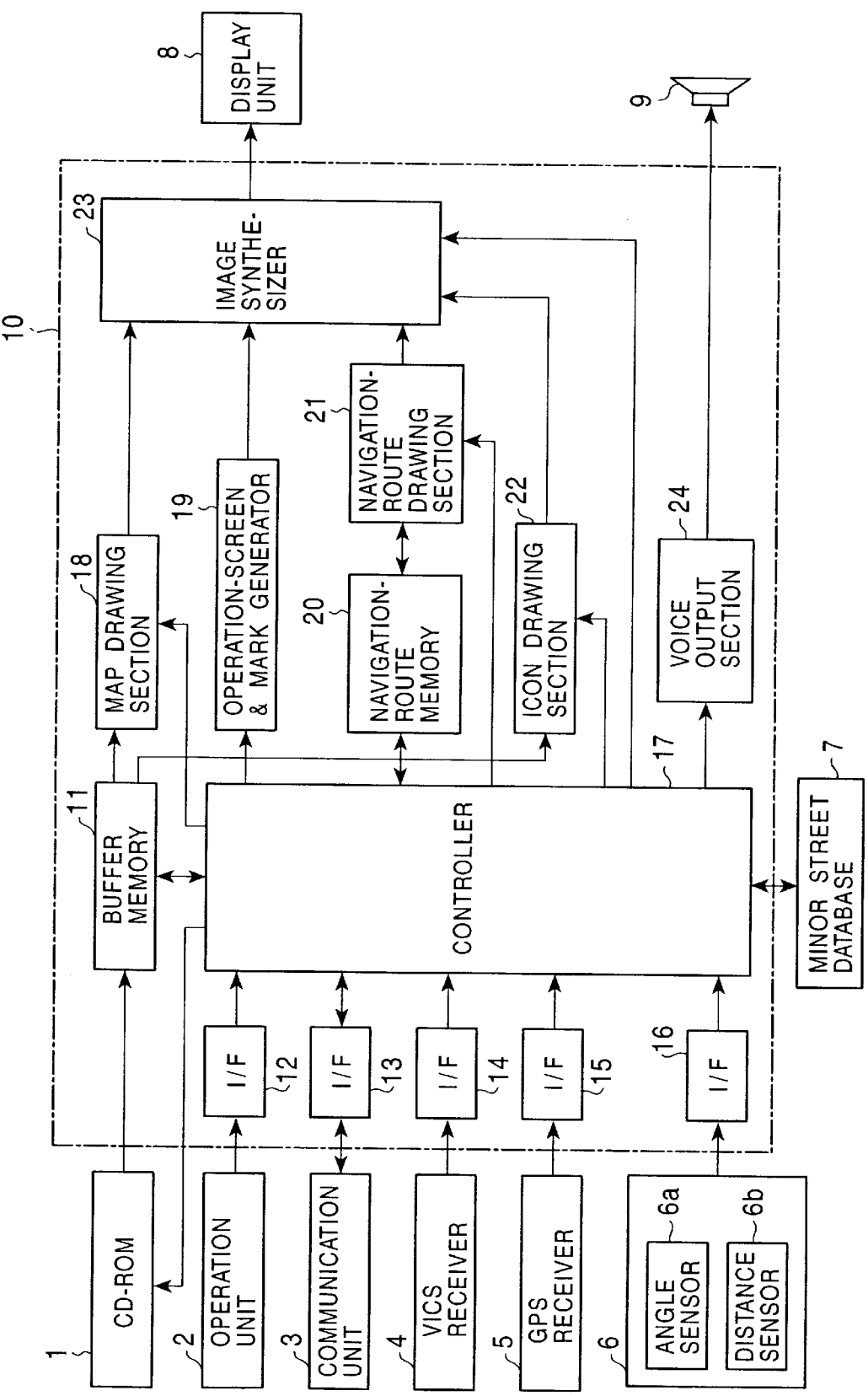
FIG. 1 is a block diagram illustrating the overall configuration of a vehicle navigation system according to the embodiment of the present invention.

FIG. 1 is a block diagram illustrating the overall configuration of a vehicle navigation system according to a first embodiment of the present invention.

Referring to FIG. 1, a CD-ROM 1 stores data, such as map data, for navigation. The map stored therein is divided into segments, each having appropriate widths of latitude and longitude in accordance with the scale (e.g., $1/12,500$, $1/25,000$, and $1/50,000$). The map includes roads (road data for display), various objects (object data), and the like which are expressed by a set of coordinate points (nodes) expressed by latitude and longitude. As data necessary for navigation, the CD-ROM 1 stores road data for route searching as well as the map data including the road data for display. The road data for route searching, however, does not include minor street data, such as small neighborhood roads, as in the conventional system.

An operation unit 2 is used for controlling the operation of a navigation system main unit 10, which is described below, and may take the form of a remote control transmitter. The remote control transmitter is provided with a joystick and various operation buttons for selection and execution of various menus and entries on a display screen. Reference numeral 3 denotes a communication unit, such as a vehicle-mounted telephone, for communication with various service centers; 4 is a VICS receiver for receiving VICS (vehicle information and communication system) information transmitted from radio beacons and/or optical beacons; 5 is a GPS receiver for receiving GPS signals transmitted from a GPS satellite to detect the longitude and latitude of the current location of the vehicle; and 6 is an autonomous navigation sensor. The autonomous navigation sensor 6 includes an angle sensor 6a, such as a gyroscope, for detecting the orientation of the vehicle and a distance sensor 6b for generating a pulse for a certain distance traveled.

A minor street database 7 stores information for use in displaying minor streets, and stores data for roads having a predetermined width (e.g., 5.5 m) or below which are not included in the road data for route searching stored in the CD-ROM 1, i.e., road data concerning minor streets that have not been conventionally searched by route searching (and that have not been used for route guidance). It is to be noted that, in the embodiment, the road data for minor streets that are stored in the minor street database 7 has no associated traffic regulation information, for ease of illustration.

Under the control of the navigation system main unit 10, a display unit 8, which uses a liquid crystal display method, displays a map for the vicinity of the vehicle's current location, a navigation route from a starting point to a destination, guiding information such as a vehicle location mark, and the like on the screen. A speaker 9 provides voice guidance information to a user.

In the navigation system main unit 10, a buffer memory 11 temporarily stores the map data and the like that are read from the CD-ROM 1 under the control of a controller 17. The operation unit 2, the communication unit 3, the VICS receiver 4, the GPS receiver 5, and the autonomous navigation sensor 6 are connected to the controller 17 through corresponding interfaces (I/F) 12, 13, 14, 15, and 16. The controller 17 is implemented with a microcomputer, and includes a program for navigation, such as processing for route searching, which is described later, and controlling of display output necessary for the route searching based on the processing. In accordance with the program, the controller 17 performs various processes associated with navigation. Examples involve detecting the vehicle's current location based on a signal provided from the GPS receiver 5 and the autonomous navigation sensor 6, reading map data or the like to be displayed from the CD-ROM 1 into the buffer memory 11, and searching for a navigation route from a starting point (the vehicle's current location) to a destination based on searching conditions that have been set using the map data or the like read into the buffer memory 11.

A map drawing section 18 renders a map image using the map data read into the buffer memory 11. An operation-screen and mark generator 19 generates various menu screens (operation screens) and various marks, such as a vehicle location mark and a cursor, depending on the operation state. A navigation-route memory 20 stores data for a navigation route. The navigation-route memory 20 records data concerning all nodes (coordinate points expressed by longitude and latitude) from a starting point to a destination that are on a navigation route searched by the controller 17 and navigation route data changed during the search. A navigation-route drawing section 21 reads navigation route data from the navigation-route memory 20 to render a navigation route in a display form (e.g., color and/or line width) different from other roads. The navigation-route drawing section 21 is also provided with a function that it can read minor street data from the minor street database 7 under the control of the controller 17 to render minor streets in a display form (in color and/or a broken line) different from other roads.

An icon drawing section 22 renders icons indicating individual objects associated with respective pieces of object data contained in map data read into the buffer memory 11. An image synthesizer 23 has a function to superimpose, on the map image rendered by the map drawing section 18, a navigation route rendered by the navigation-route drawing section 21, operation screens and various marks generated by the operation-screen and mark generator 19, and icons indicating individual objects rendered by the icon drawing section 22, as appropriate, and displays those representations on the display unit 8. The image synthesizer 23 also has a function for adding a "frame" to the right-hand side of the display screen to define the periphery thereof and of displaying the frame in a relatively distinctive form when the screen on the display unit 8 is divided into two screens in accordance with a control signal from the controller 17, as will be described later. A voice output section 24 provides voice signals to the speaker 9 in accordance with signals from the controller 17.

In this embodiment, the CD-ROM 1 corresponds to a first data storage means, the operation unit 2 corresponds to information input means, the GPS receiver 5 and the autonomous navigation sensor 6 correspond to vehicle-location determination means, the minor street database 7 corresponds to a second data storage means, the controller 17 corresponds to control means, and the icon drawing section 22 corresponds to icon drawing means.

The vehicle navigation system according to the first embodiment has the basic feature that, during route guidance to a destination on the screen of the display unit 8, and when entering a minor street that is not conventionally searched by route searching (and that is not used for route guidance), the display screen is divided into two, i.e., left and right, screens. In this case, on the left screen, a guidance route is displayed unmodified, and on the right screen, minor streets are displayed in an enlarged (i.e., reduced display scale) form relative to the left screen to perform guidance.

Thus, when the vehicle enters a minor street, the controller 17 resets the current vehicle location (in this case, an entry point into the minor street) determined in accordance with a signal output from the GPS receiver 5 or the like as a new starting point. Based on the reset, the controller 17 searches again for an optimum route to the original destination, and based on the search result, performs route guidance, including displaying minor streets, on the screen of the display unit 8.

At this point, with respect to the scale for displaying the right screen, there are two possible approaches. One approach is to select the display scale of the right screen so that it is fixed relative to the display scale of the left screen. The other approach is to variably select the display scale of the right screen depending on the length of a searched minor street. In the latter approach, the display scale is selected as appropriate so as to cover from the starting point (entry point) of the searched minor street to the end point (exit) of the minor street. The scale of the left screen (the display scale before being divided) is selected by a user setting.

As an additional feature, when performing guidance of a navigation route through use of the screen of the display unit 8, the vehicle navigation system simultaneously displays icons indicating objects (e.g., convenience stores, gas stations, fast-food restaurants, banks, and public facilities) that serve as landmarks in the vicinity of the navigation route. In this case, with respect to the original screen before being divided and the left screen after being divided, the icons to be displayed are designated based on user settings. With respect to the right screen, icons for all objects within a predetermined range (e.g., 30 m on each side of a road) in the width direction of a minor street are displayed.

Thus, even if both the left and right screens are displayed at the same scale, an object's icon that is not displayed on the left screen may be displayed on the right screen. This arrangement allows the user to easily recognize a minor street through which he or she is currently being guided and objects in the vicinity thereof.

In addition, when a minor street is displayed and is used for guidance, an "arrow" is added to each street having a one-way regulation. Since relatively many minor streets are one-way, such an "arrow" displayed on the detailed map screen that displays minor streets can prevent driving in the wrong direction when travelling in an unknown area.

As another feature of the navigation system of the invention, an additional "frame" is displayed around the right screen to define the periphery thereof after being divided into two screens. The "frame" is displayed in a relatively distinctive form, i.e., in a form that facilitates the identification by the user.

In this case, when the same display scale is selected for both the left and right screens, since the icons displayed on the left screen are designated by user settings, the same icons can be displayed on both the left and right screens depending on the setting, so that it is difficult to distinguish the left and right screens at a glance. Even in such a case, however, displaying the additional "frame" around the right screen, as described above, can make it easier to direct the user's attention to the right screen.

In addition, voice guidance by means of the speaker 9 may be concurrently used as required when the vehicle has entered a minor street. Likewise, when the vehicle is about to leave a minor street (i.e., when the vehicle is within a predetermined distance of the exit of a minor street), voice guidance from the speaker 9 may also be used.

FIGS. 2 to 5 illustrate exemplary screens associated with route guidance processing performed by the navigation system of the embodiment.

Figure 2:
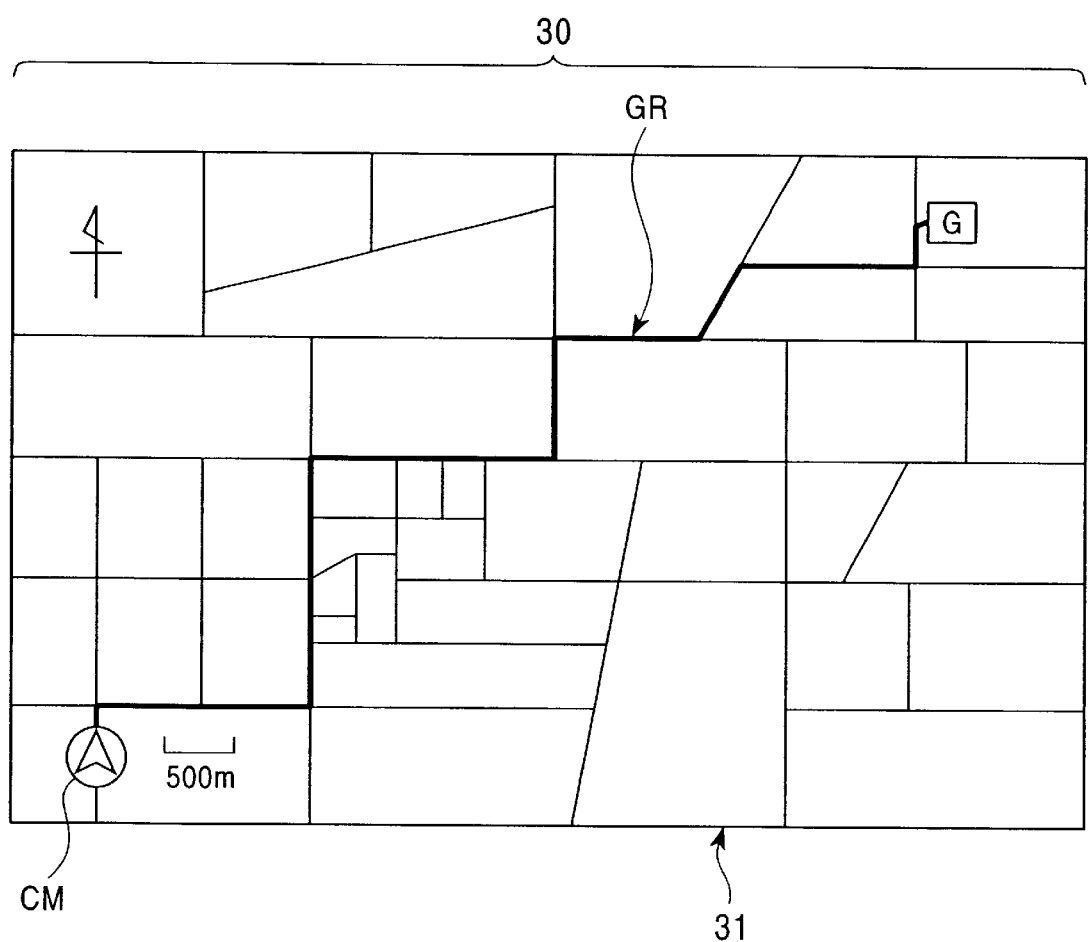
FIG. 2 is a schematic diagram of a first exemplary screen display associated with displaying a guidance route before the screen is divided.

FIG. 2 illustrates an exemplary screen display associated with displaying a guidance route before the screen is divided. More specifically, an icon G (surrounded by a square) indicating a destination, as well as a guidance route GR (i.e., a navigation route initially found by the navigation system) from the vehicle location (indicated by a vehicle location mark CM) to the destination G, are shown on a map image 31 displayed on a display screen 30.

The guidance route GR is displayed in more distinctive color and line width than the other roads so as to facilitate the identification by the user.

In the exemplary screen display in FIG. 2, the entire length of the guidance route GR from the vehicle location CM through to the destination G is displayed. However, attempting to display the entire length thereof typically results in a screen that is difficult to discern, because the scale (500 m in the example of FIG. 2) has to be relatively small depending on the distance to the destination G. According to the present invention, the scale of a screen to be displayed is adjusted (i.e. the screen display is enlarged) by a user operation to such a scale that he or she can recognize the route GR in the vicinity of the area in which he or she is currently being guided. In this case, the destination G is not displayed on the same screen; an example of this is shown in FIG. 3.

Figure 3:
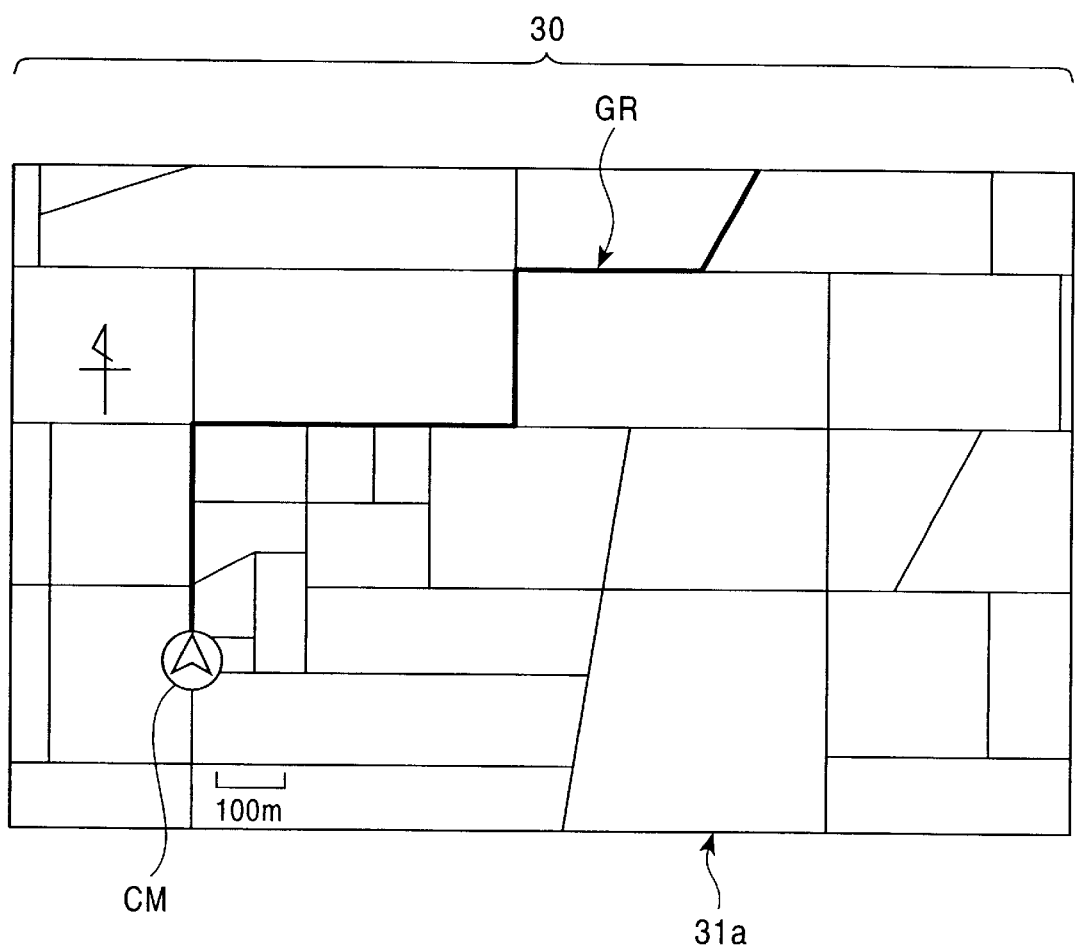
FIG. 3 is a schematic diagram of a second exemplary screen display associated with displaying the guidance route before the screen is divided.

FIG. 3 illustrates an exemplary screen display before being divided, in the same manner as FIG. 2. Specifically, the guidance route GR is displayed on a map image 31a in a more enlarged form (in the illustrated example, the scale is 100 m) than that in FIG. 2.

In the exemplary screen display in FIG. 3, a state immediately before the vehicle is about to enter a minor street while following the route GR leading to the destination is shown.

Figure 4:
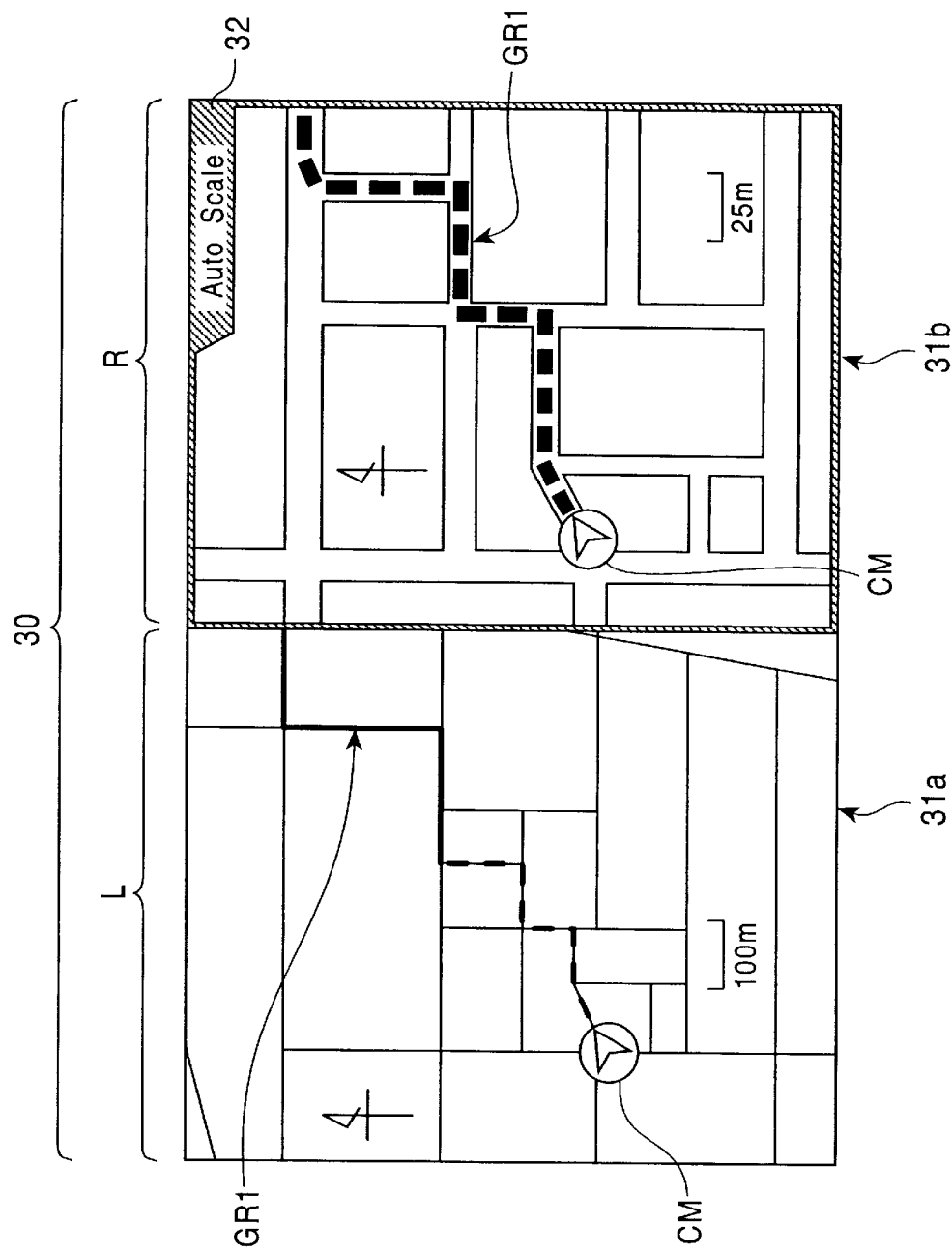
FIG. 4 is a schematic diagram of a first exemplary screen display associated with displaying the guidance route after the screen is divided.

FIG. 4 illustrates an exemplary screen display after the screen is divided into the two screens, i.e., after the display screen 30 is divided into the left screen L and the right screen R. Specifically, a guidance route GR1 leading to the destination, which has been searched for again with the entry point into the minor street as a new starting point, is displayed together with the vehicle location mark CM. On the map image 31a of the left screen L, those representations are displayed at the same scale as the scale of the screen before being divided (see FIG. 3), and on a map image 31b, they are displayed in an enlarged form (in the illustrated example, the scale is 25 m).

In the exemplary screen display in FIG. 4, portions corresponding to minor streets along the guidance route GR1 are indicated in broken lines, and portions of the navigation route that lead from the exit of the minor street to the destination are displayed in solid lines. Naturally, while the minor street portions can also be displayed in solid lines, it is preferable that the minor streets be displayed in a different form from the other roads so that the user can easily identify (confirm) when the vehicle has entered a minor street.

The frame 32 (indicated by hatching) is displayed around the right screen R, as shown, to define the periphery thereof in a relatively distinctive form (e.g., with a greater contrast and in a more distinctive color than those of the other regions) so as to facilitate the identification by the user.

In this case, when informing the user of the vehicle's entry into a minor street, in order to catch the attention of the user (in this case, the driver), voice guidance by way of the speaker 9 may concurrently be used, including a guidance message such as "We have entered a minor street" or the like. Likewise, when the vehicle is about to leave a minor street, guidance by way of voice guidance, such as "We will exit the minor street soon" may also be used.

Figure 5:
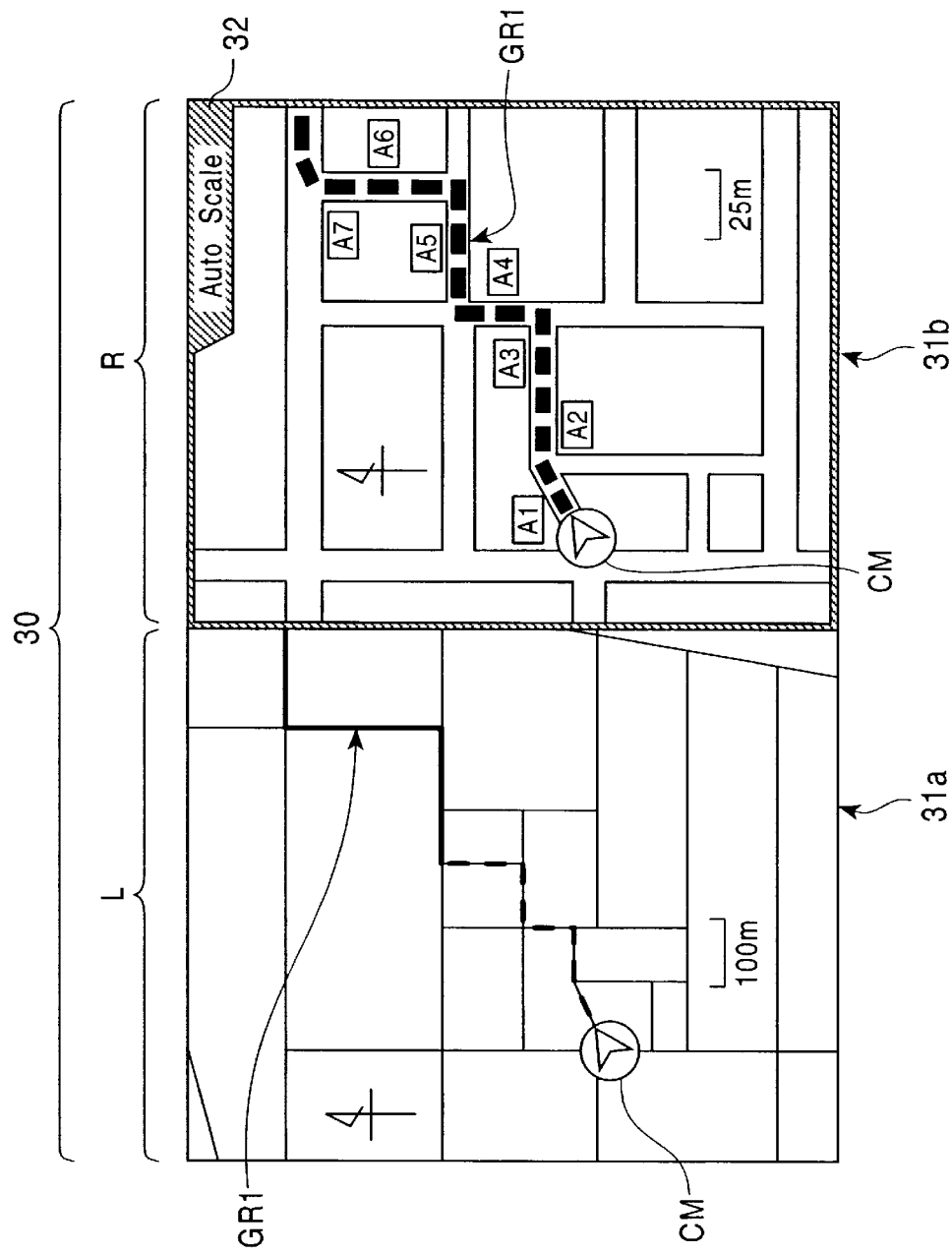
FIG. 5 is schematic diagram of a second exemplary screen display associated with displaying the guidance route after the screen is divided.

FIG. 5 illustrates an exemplary screen display after the screen is divided, in the same manner as FIG. 4. In FIG. 5, exemplary icons A1 to A7 (surrounded by squares) indicating objects (convenience stores, fast-food restaurants, banks, etc.) that are located within a predetermined distance (e.g., 30 m) of the minor street on both sides thereof are additionally displayed on the map display 31b of the right screen R.

In the exemplary screen display in FIG. 5, with respect to the left screen L, icons for indicating objects are not shown for simplicity of illustration.

Figure 6:
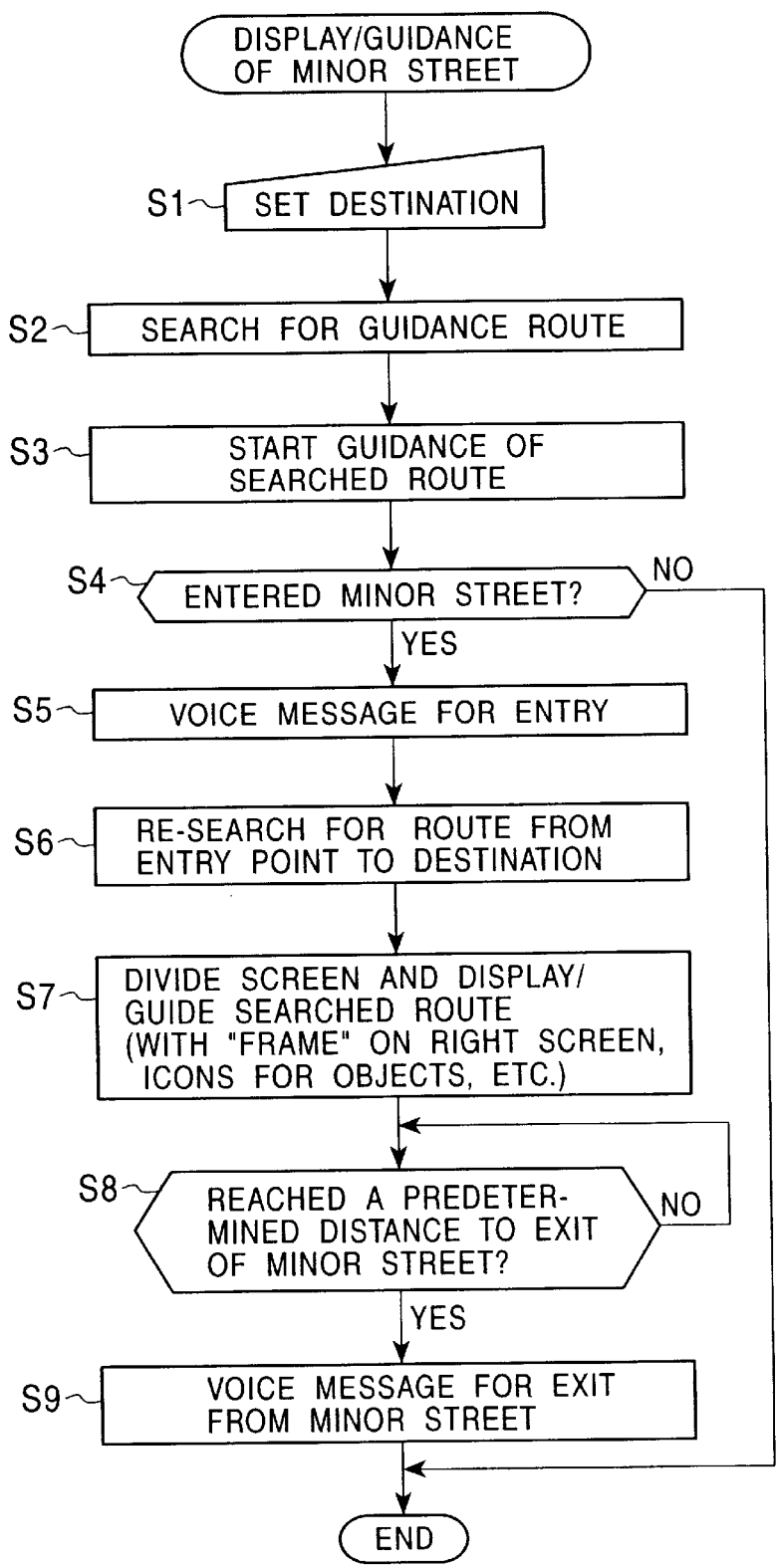
FIG. 6 is a flow chart illustrating an example of processing in which the vehicle navigation system in FIG. 1 conducts processing for displaying and guiding along a minor street.

Display and guidance processing performed by the vehicle navigation system of the embodiment will be described below with reference to the exemplary processing flow chart in FIG. 6.

First, in step S1, a user (e.g., a driver) sets a destination by operational input through the operation unit 2. The set destination data is provided to the controller 17 through the interface 12.

In step S2, searching is performed for a route to be recommended by the navigation system to the user. Specifically, the controller 17 determines the vehicle's current location based on the set data for the destination and the output signals from the GPS receiver 5 and the autonomous navigation sensor 6, to set the vehicle's current location as a starting point. Based on the starting point data, the controller 17 then reads map data for an area from the starting point to the destination and the road data for route searching from the CD-ROM 1 into the buffer memory 11. Further, the controller 17 refers to data stored in the navigation-route memory 20 to search for a guidance route, for example, by searching based on the road width, that connects the starting point to the destination with the shortest distance. It is to be noted that the roads searched in step 2 do not include minor streets.

In step 3, guidance for the found route is commenced. That is, the found guidance route is displayed on the screen of the display unit 8 while being superimposed on the map image. For example, as shown in the exemplary screen display in FIG. 2, the guidance route GR is superimposed on the map image 31 displayed on the display screen 30. This arrangement allows the user to recognize the guidance route by observing the screen of the display unit 8 and to drive the vehicle in accordance with the guidance route.

It is now assumed that, when the vehicle is being driven along the guidance route (see FIG. 3), the vehicle goes off the original route into a minor street either intentionally or accidentally.

In step 4, the controller 17 refers to road data for display contained in the map data read into the buffer memory 11 from the CD-ROM 1 in accordance with the signals output from the GPS receiver 5 and the autonomous navigation sensor 6, to determine whether the vehicle has entered a minor street (YES) or not (NO). If it is determined to be YES, the process proceeds to step S5, or if it is determined to be NO, the processing flow ends.

In step S5, voice guidance is given from the speaker 9 through the voice output section 24 under the control of the controller 17. Examples include a voice message of "we have entered a minor street". This arrangement allows the user to recognize that the vehicle has entered a minor street (in the case in which the vehicle has entered the minor street accidentally) without taking a close look at the screen displayed on the display unit 8 or allows the user to confirm the fact (in the case where it was the user's intention).

In step 6, the controller 17 sets the vehicle's current location (in this case, the entry point into the minor street), which is determined based on the signals provided from the GPS receiver 5 and the autonomous navigation sensor 6, as a new starting point, to search again for a route leading to the original destination. This repeat search for the route is performed in the same manner as the process in step S2. In step S6, however, the minor street database 7 is also referred to simultaneously in the route searching.

In step 7, the screen displayed on the display unit 8 is divided into the left and right screens in accordance with a control signal from the controller 17 through the image synthesizer 23, and the found route is displayed on the divided screens (see FIGS. 4 and 5).

First, with regard to dividing the screen, the display scale of the right screen is selected relative to the display scale of the left screen. In the exemplary screens shown in FIGS. 4 and 5, the display scale of the right screen R (25 m) is four times larger than the display scale of the left screen L (100 m).

Next, based on the result of the repeat search for a route in step 6 and the road data for minor streets stored in the minor street database 7, the guidance route is displayed unmodified on the left screen L, and on the right screen R the guidance route is displayed at an enlarged scale (by a factor of 4) relative to that of the left screen.

In this case, as shown on the exemplary screen display in FIGS. 4 and 5, the frame 32 is displayed around the right screen R to define the periphery thereof in a more distinctive color than the other portion so that the user can easily identify the frame 32.

As shown on the exemplary screen display in FIG. 5, the icons (e.g., A1 to A7) may be superimposed on the map image 31b on the right screen R to indicate objects located within a predetermined distance of the minor street on both sides thereof.

In step S8, the controller 17 refers to the road data for display contained in the map data read into the buffer memory 11 from the CD-ROM 1 in accordance with signals provided from the GPS receiver 5 and the autonomous navigation sensor 6 to determine whether the vehicle is within a predetermined distance (e.g., 100 m) of the exit of the minor street (YES) or not (NO). If it is determined to be "YES", the process proceeds to step 9, and if it is determined to be "NO", the determination process repeats.

In step 9, voice guidance is given from the speaker 9 in accordance with control signals from the controller 17. Examples of such voice guidance include a message "We will leave the minor street soon". This arrangement allows the user to recognize that the vehicle will soon leave the minor street and return to the original navigation route, without taking a close look at the screen displayed on the display unit 8. After step 9, the processing flow ends.

Since the processing flow is mainly relevant to the display/guidance of a minor street, a screen display when the vehicle has returned to the original navigation route after leaving the minor street has not been shown. In principle, the screen display after leaving the minor street is returned to the single screen display as shown in FIGS. 2 and 3. Naturally, without returning to the single screen display, the route guidance may be continued with the two screens as divided, as shown in FIGS. 4 and 5.

As described above, during route guidance to a destination on the display screen 30 of the display unit 8, when a vehicle enters a minor street that is not conventionally searched by route searching (and that is not used for route guidance), the vehicle navigation system according to the embodiment of the present invention uses the point of entry into the minor street as a new starting point to search again for a route to the destination. The display screen 30 is divided into two, i.e., left and right screens, such that, based on the result of the repeat search and road data for the minor street, the guidance route is displayed unmodified on the left screen L, and the minor street is displayed on the right screen R in a more enlarged form than the left screen L.

Accordingly, the present invention can provide the user with information for reliable navigation to a destination even for a case in which a vehicle has entered a minor street.

This arrangement allows the user to recognize, on the display screen 30 of the display unit 8, the details of a guidance route (in this case, a minor street) through use of the divided and enlarged screen (the right screen R). As a result, unlike the conventional system, the user can drive the vehicle while following the guidance route with a sense of security.

In addition, when display is performed with the divided screens (see FIG. 5), the icons A1 to A7 for indicating objects that are located within a predetermined distance on both sides of a minor street are superimposed on the map image 31b of the right screen R. This allows the user to easily recognize a minor street in which he or she is currently being guided and the objects in the vicinity thereof.

Additionally, when display is performed with the divided screens (see FIGS. 4 and 5), the frame 32 is displayed around the right screen R to define the periphery thereof in a relatively distinctive form. This arrangement can make it easier to direct the user's attention to the right screen R even when it is difficult to distinguish the left and right screens.

Furthermore, when the vehicle has entered a minor street (and is about to leave the minor street), voice guidance indicating the situation may be provided through the speaker 9. This arrangement allows the user to recognize and confirm that the vehicle has entered a minor street (and is about to leave the minor street) without taking a close look at the screen displayed on the display unit 8.

In the embodiment described above, when the vehicle has entered a minor street during route guidance to a destination on the screen of the display unit 8, the display screen is divided into two, i.e., left and right screens, such that the minor street is displayed on the right screen in a relatively enlarged form for route guidance. In view of the substance of the present invention (i.e., the feature of providing information for reliable navigation to a destination even in the case in which the vehicle has entered a minor street), the display screen does not necessarily need to be divided into the left and right screens. Thus, in essence, any configuration which can display the minor street and which can provide information for guiding the user may be used.

Accordingly, as a modification of the embodiment described above, when a vehicle has entered a minor street, a display screen that has not been displaying a minor street until that moment may be switched to a detailed map screen (a single full screen), and when the vehicle has left the minor street and returns to the navigation route, the map screen may be returned to the original screen display. That is, with reference to the exemplary screen displays (FIGS. 2 to 5) in the embodiment described above, in this modification, when a vehicle enters a minor street, the display screen (FIG. 2 or 3), which has been displaying a navigation route, is switched to a screen that displays the minor street in a relatively enlarged form (i.e., to a screen in which the map on the right screen R, shown in FIG. 4 or 5, is displayed in a single full screen mode). Thereafter, when the vehicle has left the minor street and returns to the original navigation road, the screen is switched back to the original screen.

As described above, during route guidance to a destination on the screen display on the display unit, the vehicle navigation system according to the present invention can offer information for reliable navigation to a destination even when a vehicle has entered a minor street that is not conventionally searched by route searching (and that is not used for route guidance), and can enhance usability so that the user can travel with an increased sense of security.

What is claimed is:

1. A vehicle navigation system comprising:
   current-location determination means for determining the current location of a vehicle;
   input means for inputting a destination and for giving an instruction for executing route searching;
   a display unit for displaying an image at an initial scale;
   map-information storage means for storing map data including roads to be searched in a route search and minor streets not to be searched in a route search; and
   control means for searching for a route from the vehicle location, determined by the current-location determination means, to the destination, input through the input means, based on the roads searched in the route search,
   wherein the control means determines whether or not the vehicle has entered a minor street, and when the control means determines that the vehicle has entered a minor street, the control means searches for a route from the point of entry into the minor street to the destination using the minor street data and causes the display unit to display the map data at a predetermined scale.

2. A vehicle navigation system according to claim 1, wherein, when the control means determines that the vehicle has entered a minor street, the control means searches for a route from the point of entry into the minor street to the destination using the minor street data and causes the display unit to enlarge a map, being displayed thereon, to a predetermined magnification.

3. A vehicle navigation system according to claim 1, wherein, when the control means determines that the vehicle has entered a minor street, the control means searches for the point of entry into the minor street and the point of exit from the minor street, determines a scale at which the point of entry and the point of exit are both displayable on a single map image, and causes the display unit to display the map data at the determined scale.

4. A vehicle navigation system according to one of claims 1 to 3, wherein, when the vehicle exits the minor street and enters one of the roads searched by the route search, the control means causes the display unit to display the map data at the initial scale.

5. A vehicle navigation system according to claim 1, wherein, when the control means determines that the vehicle has entered a minor street, the control means causes voice guidance for the entry to be output.

6. A vehicle navigation system according to claim 1, wherein, when the control means determines that the vehicle has entered a minor street, the control means searches for a route from the point of entry into the minor street to the destination using the minor street data and causes the display unit to display a portion corresponding to the minor street on the repeated searched route in a different form from the other portions.

7. A vehicle navigation system according to claim 1, wherein, when the vehicle leaves a minor street, the control means causes voice guidance for the exit to be output.

8. A vehicle navigation system according to claim 1, wherein the map data includes predetermined different types of facilities and the vehicle navigation system further comprises icon-drawing means for rendering a different icon for each of the facilities, and the control means searches for facilities located within a predetermined range along the searched minor street and causes the icon-drawing means to simultaneously display icons indicating the facilities found.

9. A vehicle navigation system according to claim 1, wherein the control means causes the display unit to additionally display an arrow indicating a one-way regulation for a road having the one-way regulation in the map data at the predetermined scale.

10. A vehicle navigation system comprising:
    current-location determination means for determining the current location of a vehicle;
    input means for inputting a destination and for giving an instruction for executing route searching;
    a display unit for displaying an image;
    map-information storage means for storing map data including roads to be searched in a route search and minor streets not to be searched in a route search; and
    control means for searching for a route from the vehicle location, determined by the current-location determination means, to the destination, input through the input means, based on the roads searched in the route search,
    wherein the control means determines whether or not the vehicle has entered a minor street, and when the control means determines that the vehicle has entered a minor street, the control means searches for a route from the point of entry into the minor street to the destination using the minor street data and causes the screen of the display unit to be divided into two screens such that the map data on one of the divided screens is displayed at a predetermined scale.

11. A vehicle navigation system according to claim 10, wherein, when the control means determines that the vehicle has entered a minor street, the control means searches for a route from the point of entry into the minor street to the destination using the minor street data; causes the screen of the display unit to be divided into two screens; and causes one of the divided screens to enlarge a map, being displayed thereon, to a predetermined scale.

12. A vehicle navigation system according to claim 10, wherein, when the control means determines that the vehicle has entered a minor street, the control means searches for a route from the point of entry into the minor street to the destination using the minor street data; causes the screen of the display unit to be divided into two screens; determines a scale at which the point of entry to the minor street and the point of exit therefrom are both displayable on one of the screens; and displays the map data on the one of the screens at the determined scale.

13. A vehicle navigation system according to claim 10, wherein the map data includes predetermined different types of facilities and the vehicle navigation system further comprises icon-drawing means for rendering a different icon for each of the facilities, and the control means searches for facilities located within a predetermined range along the searched minor street and causes the icon-drawing means to simultaneously display icons indicating the facilities found.

14. A vehicle navigation system according to claim 10, wherein the control means causes the display unit to additionally display an arrow indicating a one-way regulation for a road having the one-way regulation in the map data at the predetermined scale.

15. A vehicle navigation system according to claim 10, wherein the control means causes the display unit to additionally display a frame around the periphery of the screen on which the map data is displayed at the predetermined scale.

16. A vehicle navigation system according to one of claims 10 to 13, wherein, when the vehicle exits a minor street and enters any one of the roads searched in the initial route search, the control means causes the display unit to switch from the divided screens back to the initial screen.

17. A method of operating a vehicle navigation system comprising:

storing road data for roads to be searched in an initial search for a guide route;

storing minor street data for streets not searched in an initial search for a guide route;

receiving inputs identifying a first location and a destination;

conducting an initial search and determining a first guide route between the first location and the destination using the road data;

communicating the first guide route to a user;

determining whether the vehicle has deviated from the first guide route and entered a minor street;

conducting a repeat search for a second guide route between the point of entry into the minor street and the destination, where the repeat search uses the road data and the minor street data; and communicating the second guide route to the user.

18. A method according to claim 17, wherein the first location is a current location of the vehicle.

19. A method according to claim 17, wherein the second guide route is communicated to the user by displaying a map including the second guide route.

20. A method according to claim 19, wherein the map including the second guide route is displayed at a predetermined magnification.

21. A method according to claim 20, wherein the predetermined magnification is sufficient to display the point of entry into the minor street and a point of exit from the minor street on a single map image.

22. A method according to claim 19, wherein the first guide route is communicated to the user by displaying a map including the first guide route.

23. A method according to claim 22, wherein the map including the first guide route is displayed on a first portion of a display, and the map including the second guide route is displayed on a second portion of the display.

24. A method according to claim 23, wherein the map including the second guide route is displayed in an enlarged form relative to the map including the first guide route.

25. A method according to claim 23, wherein the second display portion is visually distinct from the first display portion.

26. A method according to claim 25, wherein the second display portion includes a frame displayed around its periphery.

27. A method according to claim 19, wherein the displayed map including the second guide route includes an identification of at least some facilities along the minor street.

28. A method according to claim 27, wherein a different icon is displayed for different types of facilities.

29. A method according to claim 27, wherein facilities located in a predetermined range along the minor street are displayed.

* * * * *